(12) United States Patent
Whitby-Strevens et al.

(10) Patent No.: US 10,459,674 B2
(45) Date of Patent: Oct. 29, 2019

(54) APPARATUS AND METHODS FOR PACKING AND TRANSPORTING RAW DATA

(71) Applicant: APPLE INC., Cupertino, CA (US)

(72) Inventors: Colin Whitby-Strevens, Ben Lomond, CA (US); Sreeraman Anantharaman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 830 days.

(21) Appl. No.: 14/566,554

(22) Filed: Dec. 10, 2014

(65) Prior Publication Data

US 2015/0189109 A1 Jul. 2, 2015

Related U.S. Application Data

(60) Provisional application No. 61/914,312, filed on Dec. 10, 2013.

(51) Int. Cl.
*G06F 3/14* (2006.01)

(52) U.S. Cl.
CPC ........... *G06F 3/14* (2013.01); *G09G 2370/10* (2013.01)

(58) Field of Classification Search
None
See application file for complete search history.

(56) References Cited

U.S. PATENT DOCUMENTS

| | | |
|---|---|---|
| 5,659,542 A | 8/1997 | Bell et al. |
| 5,850,395 A | 12/1998 | Hauser et al. |
| 5,943,507 A | 8/1999 | Cornish et al. |
| 6,359,863 B1 | 3/2002 | Varma et al. |
| 6,553,446 B1 | 4/2003 | Miller |

(Continued)

FOREIGN PATENT DOCUMENTS

| | | |
|---|---|---|
| EP | 3013008 A1 | 4/2016 |
| JP | 2013246642 A | 12/2013 |
| WO | WO-2008070138 A2 | 6/2008 |

OTHER PUBLICATIONS

VESA Display Port Link Layer Compliance Test Standard—Version 1.0, Sep. 14, 2007.

(Continued)

*Primary Examiner* — Henry Tsai
*Assistant Examiner* — Christopher A Bartels
(74) *Attorney, Agent, or Firm* — Gazdzinski & Associates, PC

(57) ABSTRACT

Methods and apparatus for packing and transporting data within an electronic device. In one embodiment, a consumer electronics device having one or more sensors (e.g., camera sensors) uses modified DisplayPort micro-packets for transmission of RAW format data over one or more lanes of a DisplayPort Main Steam. The RAW data is transported over the one or more lanes by mapping symbol sequences generated from the RAW data based on Y-only data mappings schemes of DisplayPort. A mapping scheme is in one variant selected based on the bits length (e.g., bits per pixel) of the RAW data, in addition to the number of lanes used to transport over the Main Stream. In order for the sink correctly unpack received the micro-packets, the transmitting source transmits Main Stream Attribute (MSA) data packets configured to indicate at least the mapping scheme used.

20 Claims, 7 Drawing Sheets

(56) References Cited

U.S. PATENT DOCUMENTS

| | | | |
|---|---|---|---|
| 6,693,895 B1* | 2/2004 | Crummey | H04L 12/5601 370/352 |
| 6,948,094 B2 | 9/2005 | Schultz et al. | |
| 7,100,020 B1 | 8/2006 | Brightman et al. | |
| 7,397,774 B1 | 7/2008 | Holland et al. | |
| 7,853,731 B1 | 12/2010 | Zeng | |
| 7,899,941 B2 | 3/2011 | Hendry et al. | |
| 7,941,682 B2 | 5/2011 | Adams | |
| 8,255,725 B2 | 8/2012 | Shimazaki et al. | |
| 8,352,624 B2 | 1/2013 | Zimmerman et al. | |
| 8,468,285 B2 | 6/2013 | Kobayashi | |
| 8,656,228 B2 | 2/2014 | Check et al. | |
| 8,788,822 B1 | 7/2014 | Riddle | |
| 8,799,537 B1* | 8/2014 | Zhu | G06F 13/385 710/14 |
| 8,848,809 B2 | 9/2014 | Whitby-Strevens | |
| 9,164,930 B2* | 10/2015 | Zeng | G06F 13/14 |
| 9,319,090 B2 | 4/2016 | Whitby-Strevens | |
| 9,544,069 B2 | 1/2017 | Whitby-Strevens et al. | |
| 10,326,981 B2* | 6/2019 | Nisenzon | H04N 13/271 |
| 2002/0044553 A1 | 4/2002 | Chakravorty | |
| 2002/0169938 A1 | 11/2002 | Scott et al. | |
| 2004/0041029 A1 | 3/2004 | Postman et al. | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0098955 A1 | 5/2005 | Rasmussen et al. | |
| 2005/0117601 A1* | 6/2005 | Anderson | G06F 13/4072 370/465 |
| 2005/0157781 A1 | 7/2005 | Ho et al. | |
| 2005/0285862 A1 | 12/2005 | Noda et al. | |
| 2007/0070997 A1 | 3/2007 | Weitz et al. | |
| 2007/0201492 A1* | 8/2007 | Kobayashi | G06F 3/14 370/395.64 |
| 2007/0286246 A1* | 12/2007 | Kobayashi | G06F 3/14 370/522 |
| 2008/0231711 A1 | 9/2008 | Glen et al. | |
| 2008/0235355 A1 | 9/2008 | Spanier et al. | |
| 2008/0301148 A1* | 12/2008 | Lee, II | G06F 17/30415 |
| 2009/0010533 A1* | 1/2009 | Hung | H04N 19/46 382/166 |
| 2009/0024924 A1* | 1/2009 | Kim | G09G 5/006 715/716 |
| 2009/0189442 A1 | 7/2009 | Chi | |
| 2010/0017655 A1 | 1/2010 | Gooding et al. | |
| 2010/0037283 A1* | 2/2010 | Zhu | G06F 3/14 725/135 |
| 2010/0082859 A1* | 4/2010 | Hendry | G06F 13/387 710/60 |
| 2010/0098419 A1 | 4/2010 | Levy et al. | |
| 2010/0104221 A1* | 4/2010 | Yeung | G06T 3/60 382/297 |
| 2010/0177245 A1 | 7/2010 | Ohnuma et al. | |
| 2010/0329319 A1 | 12/2010 | Dai et al. | |
| 2011/0052142 A1 | 3/2011 | Sultenfuss et al. | |
| 2011/0134291 A1* | 6/2011 | Rueckert | G06T 3/4015 348/280 |
| 2011/0219208 A1 | 9/2011 | Asaad et al. | |
| 2011/0242425 A1* | 10/2011 | Zeng | H04N 5/04 348/705 |
| 2011/0276710 A1 | 11/2011 | Mighani et al. | |
| 2011/0310296 A1* | 12/2011 | Lee | G09G 5/008 348/539 |
| 2011/0320861 A1 | 12/2011 | Bayer et al. | |
| 2012/0127367 A1* | 5/2012 | Glen | G09G 5/393 348/571 |
| 2012/0146989 A1* | 6/2012 | Whitby-Strevens | G09G 5/006 345/213 |
| 2012/0224640 A1* | 9/2012 | Sole Rojals | H04N 19/124 375/240.18 |
| 2012/0229076 A1* | 9/2012 | Zhu | H04L 25/02 320/107 |
| 2013/0050216 A1* | 2/2013 | Whitby-Strevens | G06F 13/14 345/428 |
| 2013/0057567 A1* | 3/2013 | Frank | G06F 3/1454 345/589 |
| 2013/0162911 A1* | 6/2013 | Glen | H04N 21/234327 348/586 |
| 2013/0222652 A1* | 8/2013 | Akeley | H04N 9/045 348/241 |
| 2013/0235941 A1* | 9/2013 | Koo | G09G 5/006 375/240.26 |
| 2014/0247983 A1* | 9/2014 | MacInnis | H04N 19/14 382/166 |
| 2014/0273833 A1 | 9/2014 | McCormack et al. | |
| 2014/0293135 A1 | 10/2014 | Shao et al. | |
| 2015/0036051 A1* | 2/2015 | Broberg | H04N 5/91 348/571 |
| 2015/0092646 A1 | 4/2015 | Tabet et al. | |
| 2015/0117601 A1 | 4/2015 | Keeve et al. | |
| 2015/0189109 A1 | 7/2015 | Whitby-Strevens et al. | |
| 2015/0205749 A1 | 7/2015 | Whitby-Strevens et al. | |
| 2015/0237264 A1* | 8/2015 | Amitay | H04N 5/23296 348/240.2 |
| 2015/0378737 A1 | 12/2015 | Debbage et al. | |
| 2016/0077989 A1 | 3/2016 | Pulyala et al. | |
| 2016/0103480 A1 | 4/2016 | Sanghi et al. | |
| 2016/0103689 A1 | 4/2016 | Sanghi et al. | |
| 2016/0103743 A1 | 4/2016 | Sanghi et al. | |
| 2016/0224442 A1 | 8/2016 | Sanghi et al. | |
| 2016/0364350 A1 | 12/2016 | Sanghi et al. | |
| 2018/0129261 A1 | 5/2018 | Garg et al. | |
| 2018/0129269 A1 | 5/2018 | Garg et al. | |
| 2018/0129270 A1 | 5/2018 | Garg et al. | |

OTHER PUBLICATIONS

VESA Display Port Panel Connector Standard—Version 1.1, Jan. 4, 2008.

VESA Display Port PHY Compliance Test Standard—Version 1, Sep. 14, 2007.

VESA Display Port Standard—Version 1, Revision 1a, Jan. 11, 2008.

VESA "Mini Display Port" technology described in the Draft VEDA Display Port Version 1.2 Standard, Dec. 22, 2009.

ECN L1 PM Substates with CLKREQ approved Aug. 23, 2012.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

\* cited by examiner

|        Lane 0        |        Lane 1         |        Lane 2          |         Lane 3         |
|----------------------|-----------------------|------------------------|------------------------|
| RAW0-5:0 | RAW4-5:4  | RAW1-5:0 | RAW5-5:4   | RAW2-5:0 | RAW6-5:4    | RAW3-5:0 | RAW7-5:4    |
| RAW4-3:0 | RAW8-5:2  | RAW5-3:0 | RAW9-5:2   | RAW6-3:0 | RAW10-5:2   | RAW7-3:0 | RAW11-5:2   |
| RAW8-1:0 | RAW12-5:0 | RAW9-1:0 | RAW13-5:0  | RAW10-1:0 | RAW14-5:0  | RAW11-1:0 | RAW15-5:0  |

FIG. 3A

|        Lane 0        |         Lane 1        |
|----------------------|-----------------------|
| RAW0-5:0 | RAW2-5:4  | RAW1-5:0 | RAW3-5:4   |
| RAW2-3:0 | RAW4-5:2  | RAW3-3:0 | RAW5-5:2   |
| RAW4-1:0 | RAW6-5:0  | RAW5-1:0 | RAW7-5:0   |

FIG. 3B

|        Lane 0        |
|----------------------|
| RAW0-3:0 | RAW1-5:4  |
| RAW1-3:0 | RAW2-5:2  |
| RAW2-1:0 | RAW3-5:0  |

FIG. 3C

| Lane 0 | Lane 1 | Lane 2 | Lane 3 |
|---|---|---|---|
| RAW0-6:0 \| RAW4-6 | RAW1-6:0 \| RAW5-6 | RAW2-6:0 \| RAW6-6 | RAW3-6:0 \| RAW7-6 |
| RAW4-5:0 \| RAW8-6:5 | RAW5-5:0 \| RAW9-6:5 | RAW6-5:0 \| RAW10-6:5 | RAW7-5:0 \| RAW11-6:5 |
| RAW8-4:0 \| RAW12-6:4 | RAW9-4:0 \| RAW13-6:4 | RAW10-4:0 \| RAW14-6:4 | RAW11-4:0 \| RAW15-6:4 |
| RAW12-3:0 \| RAW16-6:3 | RAW13-3:0 \| RAW17-6:3 | RAW14-3:0 \| RAW18-6:3 | RAW15-3:0 \| RAW19-6:3 |
| RAW16-2:0 \| RAW20-6:2 | RAW17-2:0 \| RAW21-6:2 | RAW18-2:0 \| RAW22-6:2 | RAW19-2:0 \| RAW23-6:2 |
| RAW20-1:0 \| RAW24-6:1 | RAW21-1:0 \| RAW25-6:1 | RAW22-1:0 \| RAW26-6:1 | RAW23-1:0 \| RAW27-6:1 |
| RAW24-0 \| RAW28-6:0 | RAW25-0 \| RAW29-6:0 | RAW26-0 \| RAW30-6:0 | RAW27-0 \| RAW31-6:0 |

FIG. 4A

| Lane 0 | Lane 1 |
|---|---|
| RAW0-6:0 \| RAW2-6 | RAW1-6:0 \| RAW3-6 |
| RAW2-5:0 \| RAW4-6:5 | RAW3-5:0 \| RAW5-6:5 |
| RAW4-4:0 \| RAW6-6:4 | RAW5-4:0 \| RAW7-6:4 |
| RAW6-3:0 \| RAW8-6:3 | RAW7-3:0 \| RAW9-6:3 |
| RAW8-2:0 \| RAW10-6:2 | RAW9-2:0 \| RAW11-6:2 |
| RAW10-1:0 \| RAW12-6:1 | RAW11-1:0 \| RAW13-6:1 |
| RAW12-0 \| RAW14-6:0 | RAW13-0 \| RAW15-6:0 |

FIG. 4B

| Lane 0 |
|---|
| RAW0-6:0 \| RAW1-6 |
| RAW1-5:0 \| RAW2-6:5 |
| RAW2-4:0 \| RAW3-6:4 |
| RAW3-3:0 \| RAW4-6:3 |
| RAW4-2:0 \| RAW5-6:2 |
| RAW5-1:0 \| RAW6-6:1 |
| RAW6-0 \| RAW7-6:0 |

FIG. 4C

| Lane 0 | Lane 1 | Lane 2 | Lane 3 |
|---|---|---|---|
| RAW0-13:6 | RAW1-13:6 | RAW2-13:6 | RAW3-13:6 |
| RAW0-5:0 \| RAW4-13:12 | RAW1-5:0 \| RAW5-13:12 | RAW2-5:0 \| RAW6-13:12 | RAW3-5:0 \| RAW7-13:12 |
| RAW4-11:4 | RAW5-11:4 | RAW6-11:4 | RAW7-11:4 |
| RAW4-3:0 \| RAW8-13:10 | RAW5-3:0 \| RAW9-13:10 | RAW6-3:0 \| RAW10-13:10 | RAW7-3:0 \| RAW11-13:10 |
| RAW8-9:2 | RAW9-9:2 | RAW10-9:2 | RAW11-9:2 |
| RAW8-1:0 \| RAW12-13:8 | RAW9-1:0 \| RAW13-13:8 | RAW10-1:0 \| RAW14-13:8 | RAW11-1:0 \| RAW15-13:8 |
| RAW12-7:0 | RAW13-7:0 | RAW14-7:0 | RAW15-7:0 |

FIG. 5A

| Lane 0 | Lane 1 |
|---|---|
| RAW0-13:6 | RAW1-13:6 |
| RAW0-5:0 \| RAW2-13:12 | RAW1-5:0 \| RAW3-13:12 |
| RAW2-11:4 | RAW3-11:4 |
| RAW2-3:0 \| RAW4-13:10 | RAW3-3:0 \| RAW5-13:10 |
| RAW4-9:2 | RAW5-9:2 |
| RAW4-1:0 \| RAW6-13:8 | RAW5-1:0 \| RAW7-13:8 |
| RAW6-7:0 | RAW7-7:0 |

FIG. 5B

| Lane 0 |
|---|
| RAW0-13:6 |
| RAW0-5:0 \| RAW1-13:12 |
| RAW1-11:4 |
| RAW1-3:0 \| RAW2-13:10 |
| RAW2-9:2 |
| RAW2-1:0 \| RAW3-13:8 |
| RAW3-7:0 |

FIG. 5C

| | MISC1 | MISC0 | MISC0 | MISC0 | MISC0 | Description |
|---|---|---|---|---|---|---|
| MSA Bits | [7] | [2:1] | [3] | [4] | [7:5] | |
| RAW | 1 | 01 | 0 | 0 | 001 | 6bpp |
| RAW | 1 | 01 | 0 | 0 | 010 | 7bpp |
| RAW | 1 | 01 | 0 | 0 | 011 | 8bpp |
| RAW | 1 | 01 | 0 | 0 | 100 | 10bpp |
| RAW | 1 | 01 | 0 | 0 | 101 | 12bpp |
| RAW | 1 | 01 | 0 | 0 | 110 | 14bpp |
| RAW | 1 | 01 | 0 | 0 | 111 | 16bpp |
| RAW | 1 | 01 | 0 | 0 | 000 | Reserved |

FIG. 6

APPARATUS AND METHODS FOR PACKING AND TRANSPORTING RAW DATA

PRIORITY AND RELATED APPLICATIONS

This application claims priority to U.S. Provisional Patent Application Ser. No. 61/914,312 filed Dec. 10, 2013 entitled "APPARATUS AND METHODS FOR PACKING AND TRANSPORTING RAW DATA", the foregoing being incorporated herein by reference in its entirety.

This application is related to commonly owned, and U.S. Patent Application Ser. No. 61/914,322 entitled "METHODS AND APPARATUS FOR VIRTUAL CHANNEL ALLOCATION VIA A HIGH SPEED BUS INTERFACE", filed Dec. 10, 2013, and U.S. patent application Ser. No. 14/566,454 entitled "METHODS AND APPARATUS FOR VIRTUAL CHANNEL ALLOCATION VIA A HIGH SPEED BUS INTERFACE", filed contemporaneously herewith, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of electronics devices, and networks thereof. More particularly, portions of the disclosure are directed to, inter alia, methods and apparatus for packing and transporting data received from data content sources.

2. Description of Related Technology

DisplayPort (see, inter alia, www.DisplayPort.org) is an exemplary digital display interface technology specified by the Video Electronics Standards Association (VESA). Current incarnations of the standard specify support for simple networking of digital audio/visual (A/V) interconnects, intended to be used primarily between an arbitrary assembly of multimedia "sources" (e.g., computers or CPUs) and "sinks" (e.g. display monitors, home-theater system, etc.). This interconnection is generally unidirectional in nature; i.e., from source to sink, in current implementations.

The typical DisplayPort connection includes multiple data lanes (e.g. 1, 2, or 4 data pairs), and an embedded clock. Unlike other standards (e.g., HDMI, DVI), DisplayPort embeds the clock in the data signal transmission, and requires clock regeneration at the receiver. Audio signals may be optionally included, but are not required. The bi-directional auxiliary channel (operating at a constant 1 Mbit/s) carries management and device control data. The data transmission protocol in DisplayPort is based on micro-packets which can be transmitted isochronously. The isochronous delivery of DisplayPort provides, among other things, some flexibility and extensibility for future feature additions.

For reasons described in greater detail hereinafter, incipient research is directed to leveraging portions of DisplayPort technology for internal consumer electronics device operations (e.g., bus interfaces, etc.). Various implementation-specific considerations require modifications to the underlying DisplayPort scheme. For example, certain data formats generated by components (e.g., camera modules, etc.) are not supported for transfer over DisplayPort bus protocols including, but not limited to, raw (e.g., RAW) formatted data.

Accordingly, improved methods and apparatus are needed to support internal consumer electronics device operations using DisplayPort technology. More generally, apparatus and methods are needed for packing and transporting data received within an electronics device.

SUMMARY

The present disclosure satisfies the foregoing needs by providing, inter alia, methods and apparatus for packing and transporting data received from a data content source (or sources).

Firstly, a method of packing raw data over an interface is disclosed. In one embodiment, the method includes: receiving data configured according to a first image format from a data content source; encoding the received data using into a plurality of symbol sequences using an encoding scheme of a second image format, the first image format being different from the second image format; and mapping the plurality of symbol sequences into a plurality of transport packets for transmission over the interface, the mapping based at least in part on a transport packet mapping scheme associated with the second image format.

An apparatus configured to pack and transport data raw within an electronic (e.g., consumer) device is also disclosed.

A non-transitory computer readable apparatus is also disclosed. In one embodiment, the apparatus comprises a medium having instructions configured to, when executed by a processor, cause the processor to pack and transport raw data within a consumer device.

In one aspect, a method of packing raw data over an interface is disclosed. In one embodiment, the method includes: capturing image data in a raw format, by an image sensor, for subsequent transmission to a sink device over a data channel; encoding and mapping the image data to a plurality of micro-packets in one or more DisplayPort symbol sequences in accordance with a DisplayPort Y-only data mapping scheme; inserting a main stream attribute (MSA) packet into the plurality of micro-packets, the MSA packet configured to indicate that the image data is formatted according to the raw format; and transmitting the plurality of micro-packets to the sink device in accordance with the mapping via the data channel.

In one variant, the image data comprises data of a fixed bit length. In certain implementations, the fixed bit length is selected from the group consisting of: 6, 7, 8, 10, 12, and 14 bits per pixel. In certain implementations, the MSA packet is further configured to indicate the fixed bit length. In certain variants, the fixed bit length is indicated with 3 bits of a configuration field of the MSA packet.

In another variant, the DisplayPort Y-only data mapping scheme is configured based on a bit length of one or more pixel data in the image data as well as a number of lanes used for transmitting the image data. In one such case, the number of lanes used for transmitting the image data is selected from the group consisting of: (i) 1, (ii) 2, and (iii) 4 lanes.

In one variant, the mapping is based on a time division multiplexing based scheme.

In another variant, the sink device is configured to receive the plurality of micro-packets via the data channel. In one such variant, the sink device is configured to unpack and reconstruct the plurality of micro-packets into a copy of the image data in the raw format. In one such instance, the sink device is configured to process the copy of the image data into a format suitable for display.

A method of packing raw data over an interface is disclosed. In one embodiment, the method includes: receiving data configured according to a first image format from a data content source; encoding the received data into a plurality of symbol sequences according to an encoding scheme based on a second image format different from the first image format; and mapping the plurality of symbol sequences into a plurality of transport packets for transmission over the interface, the mapping based at least in part on a transport packet mapping scheme associated with the second image format.

In one variant, the first image format comprises a raw image format characterized by a defined bit length for each symbol sequence.

In another variant, the data content source comprises an image sensor.

In yet a third variant, the encoding scheme is additionally based on a number of lanes of a main link that is used to transmit the plurality of transport packets.

In a fourth variant, the mapping scheme is based on a time division multiplexing based scheme. In some cases, the mapping scheme is further configured to packetize a single data unit across multiple different transport packets.

In still other variants, the first image format is an RBG encoding and the second image format is a Y-only encoding.

An image packing system is disclosed. In one embodiment, the image packing system includes: an image sensor; an interface, the interface configured to transport data; and a processing entity in communication with the image sensor and the interface. In one variant, the processing entity is configured to: receive data configured according to a first image format from the image sensor; encode the received data using into a plurality of symbol sequences according to an encoding scheme based on a second image format different from the first image format; and map the plurality of symbol sequences into a plurality of transport packets for transmission over the interface based at least in part on a transport packet mapping scheme associated with the second image format.

In one such variant, the first image format is an RBG encoding and the second image format is a Y-only encoding; and the first image format comprises a raw image format of characterized by a defined bit length for each symbol sequence.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 3A is an exemplary table illustrating a mapping of 6 bits per pixel RAW data into a 4-lane Main Link, in accordance with the principles described herein.

FIG. 3B is an exemplary table illustrating a mapping of 6 bits per pixel RAW data into a 2-lane Main Link, in accordance with the principles described herein.

FIG. 3C is an exemplary table illustrating a mapping of 6 bits per pixel RAW data into a 1-lane Main Link, in accordance with the principles described herein.

FIG. 4A is an exemplary table illustrating a mapping of 7 bits per pixel RAW data into a 4-lane Main Link, in accordance with the principles described herein.

FIG. 4B is an exemplary table illustrating a mapping of 7 bits per pixel RAW data into a 2-lane Main Link, in accordance with the principles described herein.

FIG. 4C is an exemplary table illustrating a mapping of 7 bits per pixel RAW data into a 1-lane Main Link, in accordance with the principles described herein.

FIG. 5A is an exemplary table illustrating a mapping of 14 bits per pixel RAW data into a 4-lane Main Link, in accordance with the principles described herein.

FIG. 5B is an exemplary table illustrating a mapping of 14 bits per pixel RAW data into a 2-lane Main Link, in accordance with the principles described herein.

FIG. 5C is an exemplary table illustrating a mapping of 14 bits per pixel RAW data into a 1-lane Main Link, in accordance with the principles described herein.

FIG. 6 is an exemplary table illustrating the configuration of a Main Stream Attribute (MSA) packet to indicate the data format and bit length size, in accordance with the principles described herein.

Figure 1:
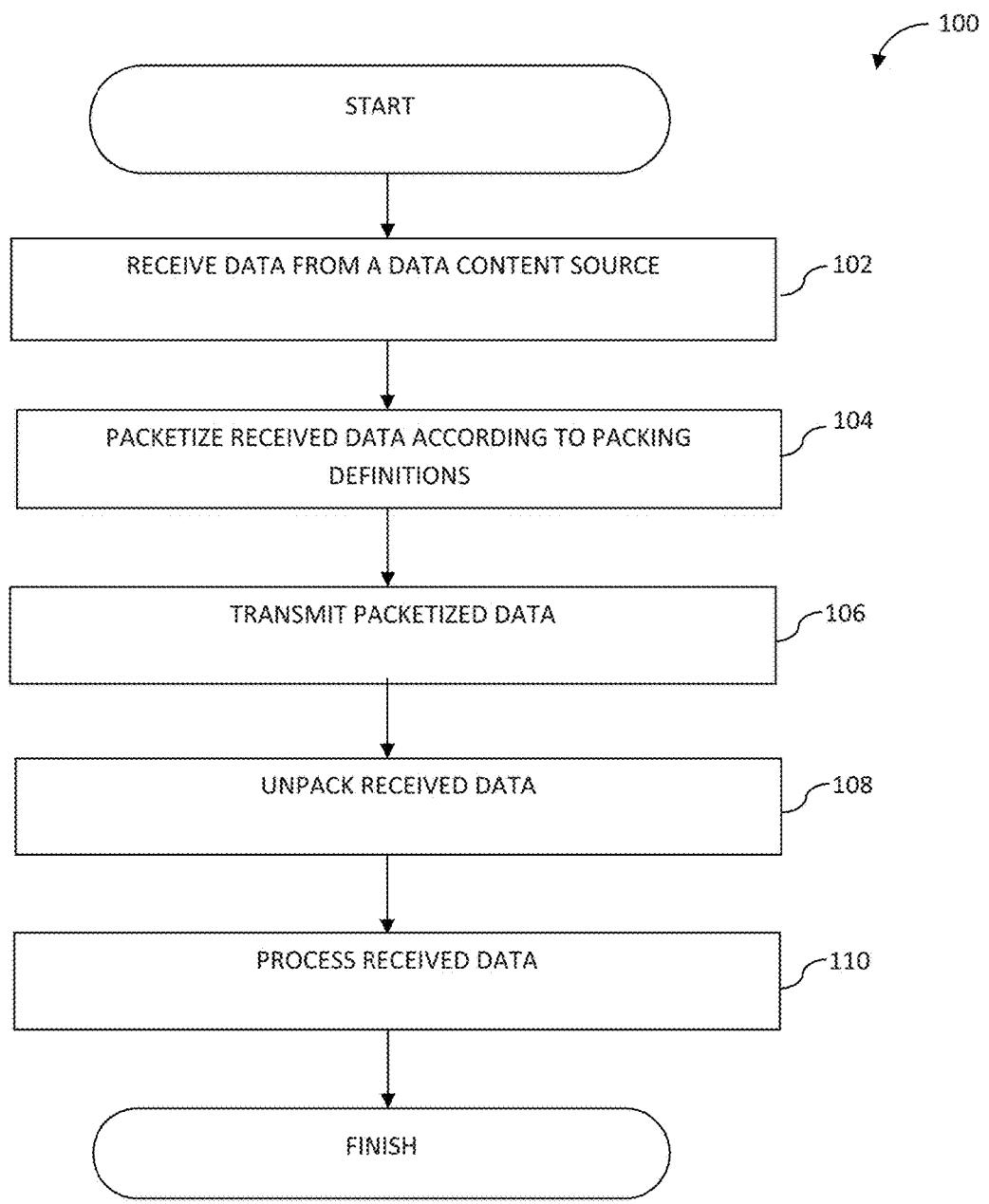
FIG. 1 is a logical flow diagram of one embodiment of a generalized method for packing and transporting data received from a data content source according to the disclosure.

All Figures © Copyright 2013-2014 Apple Inc. All rights reserved.

DETAILED DESCRIPTION

Reference is now made to the drawings, wherein like numerals refer to like parts throughout.

Overview

The present disclosure describes, inter alia, methods and apparatus for packing and transporting data (such as e.g., RAW format data) over an interface. In one embodiment, the (RAW) data generated from an image sensor is transported over a DisplayPort-compliant interface. In preparation to transport the RAW data, the RAW data is encoded into symbol sequences according to a Y-only (i.e. grayscale) data mapping scheme. The symbol sequences are mapped, per the mapping scheme, into micro-packets for transmission (e.g., over the Main Stream). The mapping scheme is in one variant selected based on the bit length of data units of the RAW data (e.g., bits per pixel), in addition to the number of lanes used to transport over the Main Stream (e.g., 1, 2, or 4 lanes).

In order for the sink to correctly unpack received the micro-packets, the transmitting source of the exemplary implementation provides Main Stream Attribute (MSA) data packets configured by indicating the data format of the data (e.g., RAW) in addition to the bit length of the data units. The MSA data packets are sent once per frame during a blanking interval, and are indicative of the frame's respective payload data. Thus, by reading the MSA data packets, the sink device can determine the mapping scheme used to pack the micro-packets in order to successfully unpack the received data.

After the RAW data has been unpacked and reassembled, the RAW data may be processed into a more suitable format based on application.

Detailed Description of Exemplary Embodiments

Exemplary embodiments of the present disclosure are now described in detail. While these embodiments are primarily discussed in the context of a Video Electronics Standards Association (VESA) DisplayPort audio/visual (A/V) component network, it will be recognized by those of ordinary skill that the present disclosure is not so limited. In fact, the various portions of the disclosure are useful in packing data over any virtually any communication protocol.

As used herein, the term "DisplayPort" refers without limitation to apparatus and technology compliant with "VESA DisplayPort Standard"—Version 1, Revision 1a dated Jan. 11, 2008; "VESA DisplayPort Panel Connector Standard"—Version 1.1 dated Jan. 4, 2008; "VESA DisplayPort PHY Compliance Test Standard"—Version 1 dated Sep. 14, 2007; and/or "VESA DisplayPort Link Layer Compliance Test Standard"—Version 1.0, dated Sep. 14, 2007, as well as so-called "Mini DisplayPort" technology described in the VESA DisplayPort Version 1.2 Standard dated Dec. 22, 2009, each of the foregoing (and any subsequent revisions thereof) being incorporated herein by reference in its entirety.

Exemplary DisplayPort Technology

Extant DisplayPort technology is an extensible digital interface solution that is designed for a wide variety of performance requirements, and broadly supports PCs, monitors, panels, projectors, and high definition (HD) content applications. DisplayPort technology is capable of supporting both internal chip-to-chip, and external box-to-box digital display connections. Examples of internal chip-to-chip applications include notebook PCs which drive a display panel from a graphics controller, or display components from display controllers driving the monitor of a TV. Examples of box-to-box applications include display connections between PCs and monitors, and projectors (e.g., not housed within the same physical device).

The camera component inside most consumer electronics devices (e.g., iOS devices such as the iPad and iPhone devices manufactured by the Assignee hereof) is a simple image sensor and/or controller that does not have significant indigenous processing capabilities. Traditionally, camera data was streamed via a Mobile Industry Processor Interface (MIPI) to the application processor. Incipient research is directed to adapting DisplayPort technology for use with internal components (such as the aforementioned camera sensors that lack processing capability). DisplayPort technologies offer much higher bandwidths and desirable features (e.g., multi-stream capability, etc.). However, DisplayPort does not currently define encoding and transportation protocols for all possible data formats generated by the image sensor such as, for example, the RAW format data.

Methods

FIG. 1 depicts an embodiment of a generalized method 100 for packing and transporting data received from a data content source, according to the present disclosure.

At step 102 of the method 100, data is received from a data content source. A data content source is any component and/or device responsible for generating the received data. Examples of data content sources include processors outputting processed content (such as e.g., media files) and sensory devices configured to capture information and output the corresponding data (such as e.g., imaging sensors).

In one embodiment, the received data comprises a plurality of data units of a defined bit length. The received data units may be formatted according to a plurality of different formats and/or compression schemes. Such data formats may include, but are not limited to, RAW, RGB, YCbCr, and Y-only format data. In one implementation, the data unit is a pixel defined by a number of bits per pixel (BPP).

At step 104, the received data is packetized according to one or more packing definitions for transmission over an interface. In one embodiment, the packing definitions are based on one or more characteristics of the received data. Such characteristics of the received data may include, but are not limited to, a type of data, the data format, the bit size of data units of the received data, etc.

In one implementation, the packing definitions are further defined by how the packetized data will be transmitted. For example, in the DisplayPort standard, data may be transmitted to a source using 1, 2, or 4 lanes of a Main Link, where a lane is a differential data pair in the Main Link. Thus, depending on how many lanes will be used for the transmission, packing definitions will define how the packets of the received data will be formed and mapped to those lanes for transmission.

The packing definitions may be further configured to define an order of transmission of the formed packets over the respective data lanes. For example, in time division multiplexing (TDM) based transmission schemes, the packing definitions may further define the time slots that the packets will be transmitted. In one implementation, portions of a single data unit may be mapped and packetized across a plurality of different packets. In addition, portions of different data units may be mapped to a same packet. For example, if a packet is defined with a payload of eight (8) bits, six (6) bits of a first data unit are packed with two (2) bits of a second data unit to comprise the eight (8) bit payload.

In the instance where the interface protocol does not directly support the format of the received data, a packing definition may be selected based on similarities of the unsupported and supported formats. In one variant, the similarity of the data format is based on the number of distinct information used by the format. For example, RGB data has distinct information for red, green, and blue data, whereas Y-only data only has distinct information about Y (grayscale) data. Thus, a packing definition for a supported format may be suitable for use with, e.g., an unsupported format comprising the same number of distinct information.

At step 106, the packetized data is transmitted over the communication interface. In one embodiment, each packet is transmitted to a sink as defined by the packing definition(s). The packing definition(s) may define the order in which packets, or portions thereof, are sent over the interface. In addition, the packing definition(s) may also define which resources of the interface to use to transmit any particular packet.

The packing of the data into data structures may incorporate a specific format, etc. For example, the DisplayPort transmitter forms micro-packets (typically 64 bytes long) from a sequence of symbols (e.g., 64 8B/10B symbols, etc.). Each DisplayPort micro-packet includes a header and payload. In other technologies, a packet may incorporate other information, such as e.g., address, length, sequence number, checksum, etc.

In one implementation, a definition packet is transmitted in addition to the packetized data. The definition packet is configured to define how the data was packetized and/or transmitted over the interface. For example, the definition packet may be configured to indicate the format of the data and/or the bit length of data units. Thus, the definition packet may be used by the receiving source to unpack the received packets back into their respective data units by indicating the particular packing definition used to packetize and transmit the data.

At step 108, the received packetized data is unpacked back into the received data according to the packing definition used for transmission. The unpacked data may comprise e.g., a unitary block of data, or may comprise individual data units of the received data. In one embodiment, the used packing definition is transmitted to the receiving device along with the packetized data. The packing definition may be inserted within portions of the packetized data or, alternatively, provided via out-of-band signaling, or yet other mechanisms that will be recognized by those of ordinary skill given the present disclosure.

At step 110, received unpacked data may be processed according to another format. In one embodiment, the unpacked data is processed into a desired video or image format, such as for example RBG, YCbCr, MPEG, JPEG, TIFF formats. Alternatively, no processing is performed at this step in another implementation.

As a brief aside, images encoded in an RBG are encoded such that each pixel has a separate red, blue, and green value. Other RBG-like formats exist such as RBGA which includes an alpha channel (normally used as an opacity channel). Images encoded in YCbCr format are encoded such that each pixel has a separate luma (i.e., brightness or achromatic portion), and two color difference values (i.e., Cb is blue minus luma and Cr is red minus luma). YCbCr values can be sampled using different encoding schemes expressed as a three part ratio J:a:b where J represents the horizontal sampling reference (usually 4), a represents the number of chrominance samples (Cr, Cb) in the first row of J pixels, and b represents the number of chrominance samples (Cr, Cb) between first and second rows of J pixels. One of ordinary skill given the present disclosure will understand that the image data can be encoded in any number of ways using any number of available color spaces.

In some embodiments, data may be provided for real-time execution (e.g. visual display/recording, audio playback/recording, etc.) to one or more receiver devices. In various implementations, "real-time" execution may entail immediate (or substantially immediate) use of the data payload without error correction or with limited error correction. For example, with some video applications, the video data payload may be directly rendered; bit errors may result in infrequent barely perceptible visual artifacts.

Example Operation

Figure 2:
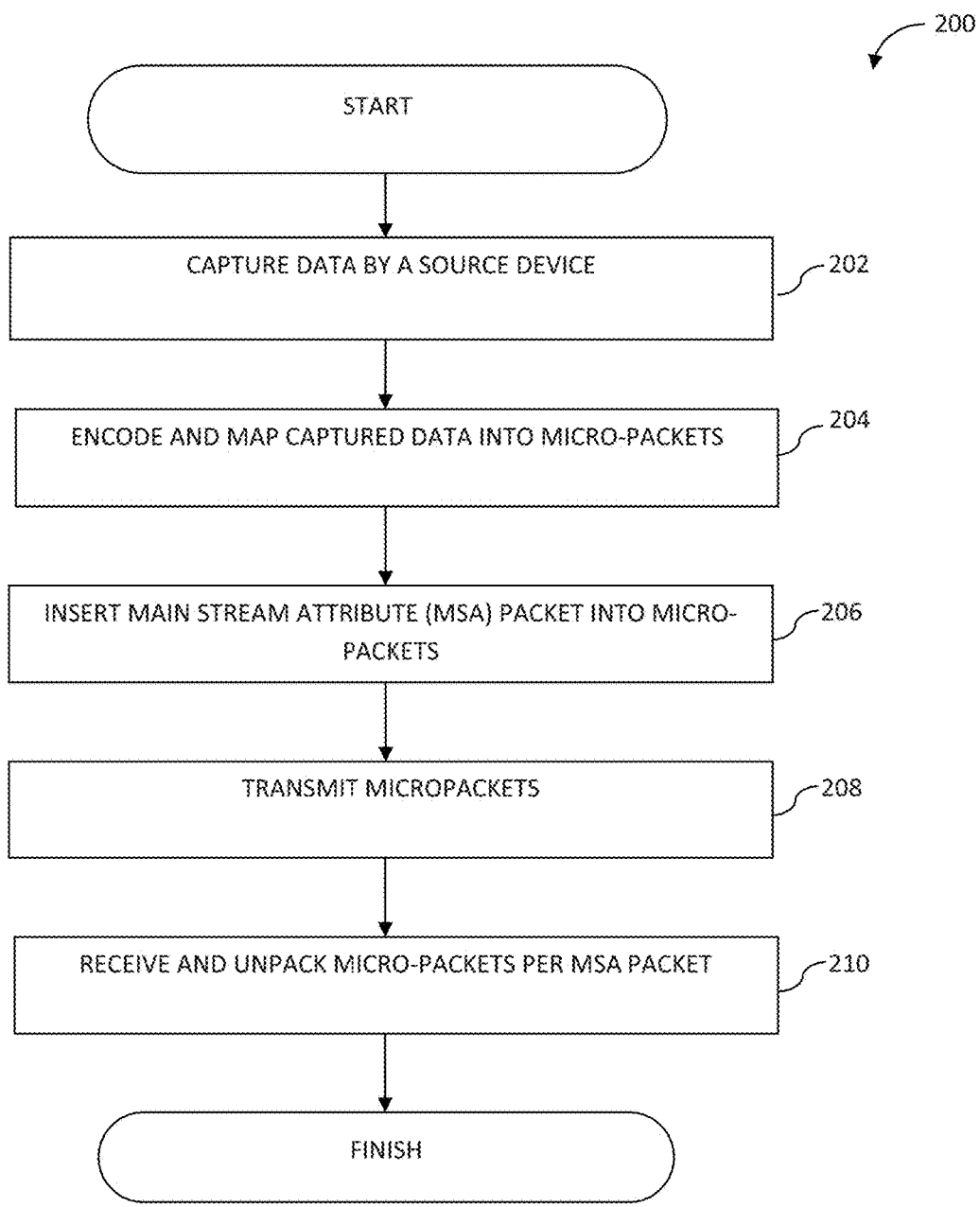
FIG. 2 is a logical flow diagram of an exemplary embodiment of a method of packing and transporting RAW data over an exemplary DisplayPort-based network.

Referring now to FIG. 2, an example operation of packing and transporting RAW data over a DisplayPort-based network is shown and described herein.

At step 202, a source device captures data for transmission over a video stream to a sink device over a data channel. The source device in this example comprises an image sensor capable of capturing image and/or video information in accordance with a RAW data format. The RAW data is in the form of arbitrary data values that can various fixed bit lengths of 6, 7, 8, 10, 12, 14, or 16 bits long. Each data value represents pixel data, thus the fixed bit width length comprises the number of bits per pixel (BPP).

At step 204, the captured RAW pixel data is encoded in DisplayPort symbol sequences and mapped to micro-packets per a defined mapping scheme. Each DisplayPort symbol sequence consists of 8-bits. The RAW data is encoded into symbol sequences in accordance with the Y-only data (i.e., Grayscale) mapping scheme as described in the DisplayPort specification, Version 1.2 (published by the Video Electronics Standards Association (VESA) on Dec. 22, 2009), incorporated herein by reference in its entirety. The particular mapping scheme is selected based on the bit length of the pixel data (e.g., BPP) as well as the number of lanes used to for transmitting the data. However, DisplayPort does not currently define the mapping schemes for bit lengths of 6, 7, and 14 BPP. Accordingly, the mapping schemes for these aforementioned BPP sizes for Y-only data must be defined.

FIGS. 3A-5C illustrate exemplary Y-only mapping scheme tables used for encoding and mapping pixel data to micro-packets for transmission for the aforementioned bit lengths. The exemplary Y-only mapping scheme tables are based on existing Y-only mapping scheme tables for defined bit lengths. One salient advantage of basing the mapping schemes of FIGS. 3A-5C on the Y-only data, is that hardware support for the aforementioned mapping schemes may be made generic to existing Y-only data hardware support. However, other mapping schemes for the aforementioned bit lengths may be used, as will be recognized by a person of skill given the present disclosure.

Referring now to FIG. 3A, an exemplary mapping scheme for encoding pixel data 6 BPP in length into symbol sequences, and arranging the symbol sequences into micro-packets units transmitted over four lanes, is illustrated. The order of the symbol sequences are arranged in order from the top row down. The notation used in the mapping scheme tables is consistent with notation used in the DisplayPort specification. Each entry in the table defines what bit portions of particular pixel data units are encoding into a particular symbol sequence. For example, in the first entry on Lane 0, pixel data from pixel data units RAW0 and RAW4 are encoding into a symbol sequence in the order of left to right. The notation RAW0-5:0 indicates that bits 5 thru 0 will be the first 6-bits of the symbol sequence. Accordingly, bits 5 thru 4 of RAW 4 are the last two bits of the symbol sequence to create the 8-bit symbol sequence. This aforementioned symbol sequence is mapped into the micro-packet pixel data payload which will be transmitted over Lane 0. The remaining symbol sequences of Lane 0 (i.e. RAW4-3:0|RAW8-5:2 and RAW8-1:0|RAW12-5:0) will be mapped to the same pixel data payload in descending order. The remaining slots of the pixel data payload not comprising encoded symbol sequences of pixel data may be stuffed with dummy symbols to maintain transmission timing over the respective lane.

At step 206, a Main Stream Attribute (MSA) packet is inserted into each frame. The MSA packet is configured to indicate the underlying format of the data being sent (e.g., RAW data), in addition to the bit length size of the data units of the data (e.g., bits per pixel).

FIG. 6 is an exemplary table illustrating the configuration of an MSA packet to indicate the data format and bit length size. For example, to indicate a RAW format, bit 7 of MISC1 and bits 2 thru 1 of MISC0 are set to 1, while bits 3 and 4 of MISC0 are set to 0. Bits 7 thru 5 of MISC0 are configured to indicate the bit length size in terms of bits per pixel. For example, setting bits 7 thru 5 to 001 indicates a bit length size of 6 BPP. Therefore, by transmitting the configured MSA packet, a sink device receiving the stream data and the MSA packet can determine how to successfully unpack the received data back into the RAW format.

At step 208, the packaged micro-packets are transmitted to the sink in accordance with the mapping. It should be noted that any other necessary steps such as stuffing and framing the micro-packets as required in DisplayPort are performed prior to the transmission to the sink.

At step 210, the received micro-packets are unpacked and reconstructed into RAW data in accordance with the mapping scheme as indicated per the transmitted MSA packet. The sink device comprises at least a processor configured to process the RAW data into a format suitable for displaying the captured image or video information.

Exemplary Apparatus

An exemplary embodiment of a component architecture is now described in greater detail. As described herein, the main video streams from such components are based on DisplayPort Multiple Stream Transport (MST) as outlined in the DisplayPort specification, Version 1.2 (published by the Video Electronics Standards Association (VESA) on Dec. 22, 2009), previously incorporated herein by reference in its entirety. However, main streams may be based on the DisplayPort Single Stream Transport (SST), as would be recognizable by a person of ordinary skill. Unlike existing DisplayPort implementations which are managed by a source component, the disclosed embodiments are managed by a sink component. One exemplary management technique is described in commonly owned and co-pending U.S. patent application Ser. No. 14/566,454, entitled "METHODS AND APPARATUS FOR VIRTUAL CHANNEL ALLOCATION VIA A HIGH SPEED BUS", filed concurrently on Dec. 10, 2014, incorporated herein by reference in its entirety.

Figure 7:
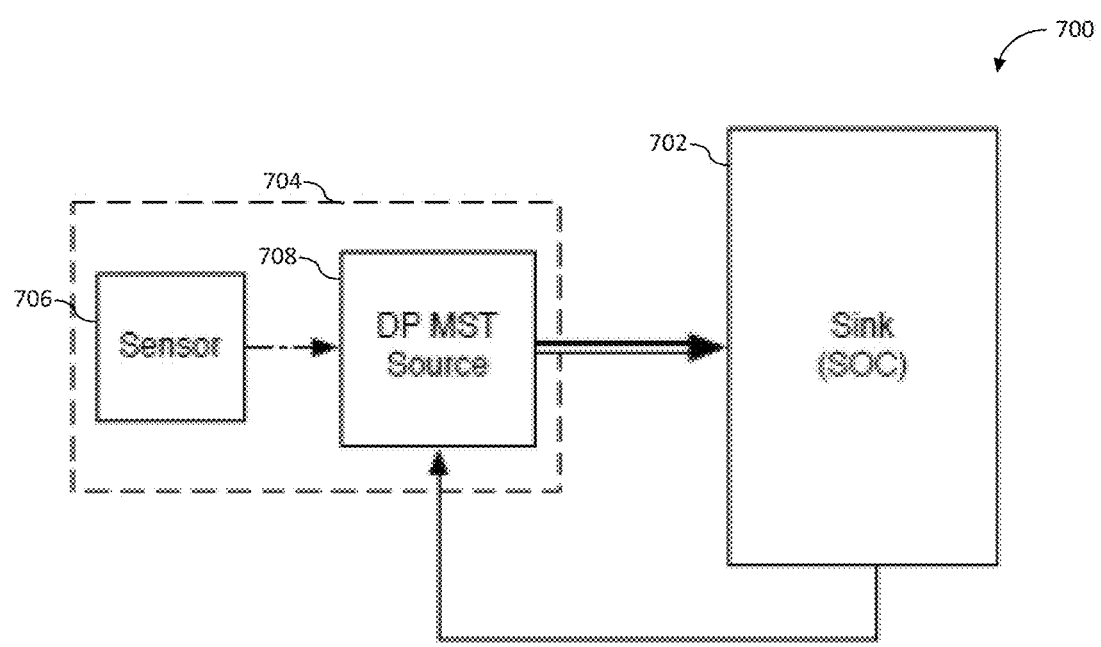
FIG. 7 is a logical block diagram of one exemplary embodiment of an A/V apparatus comprising a single camera sensor assembly outputting a single stream to a system on a chip (SoC), in accordance with the principles described herein.

Referring now to FIG. 7, one exemplary embodiment of an A/V apparatus 700 according to the disclosure is depicted. As shown, the A/V apparatus 700 comprises a single sensor assembly 704 (e.g., camera sensor assembly) outputting a single DisplayPort stream (e.g., a video stream and associated metadata transmitted in DisplayPort Secondary Packets) to the system on a chip (SoC) 702. The camera sensor assembly 704 is the source of the single DisplayPort stream; the SoC 702 is the sink of the single DisplayPort stream.

In one exemplary embodiment, the camera sensor assembly 704 includes the physical camera sensor 706 and a simplified DisplayPort MST source 708. The simplified DisplayPort MST source is configured to pack sensor data into the DisplayPort protocol MST packets for transmission to sink. The MST packets are defined unit of micro-packets in the MST mode. The packing of the sensor data is based on the format of the sensor data, the number of bit length of the data units of the sensor data (e.g., bits per pixel), and the number of lanes used to transmit the data over the main stream in accordance with principles of the present disclosure as discussed herein.

In one variant, the camera sensor assembly 704 is contained within a single component (within the same silicon chip); in other implementations, the camera sensor assembly 704 may be formed from various discrete components. The interface between the physical camera sensor 706 and simplified DisplayPort MST source 708 is typically an internal implementation dependent interface. In some cases, the interface is proprietary.

The camera sensor assembly 704 includes circuitry configured to pack data for transmission via one or more main lanes according to a transmitter mapping data structure. The transmitter mapping data structure identifies for each stream of data, a corresponding resource for transmission. In one embodiment, camera sensor assembly 704 transmits data in a stream according to one or more corresponding timeslots designated by the mapping data structure. The sink SoC 702 includes circuitry configured to unpack data received via one or more main lanes according to a receiver mapping data structure. The mapping data structure identifies which resources correspond to a stream of data.

As used herein, the term "circuitry" refers without limitation to any type of component or device having any level of integration (including without limitation ULSI, VLSI, and LSI) and irrespective of process or base materials (including, without limitation Si, SiGe, CMOS and GaAs), as well as discrete components such as resistors, diodes, capacitors, inductive reactors, and any combinations of the foregoing.

The SoC sink 702 processing subsystem is tightly coupled to operational memory, which may include for example SRAM, FLASH and SDRAM components. The processing subsystem may also comprise additional co-processors, such as a dedicated graphics accelerator, network processor (NP), or audio/video processor.

The SoC sink 702 is adapted to receive one or more media streams from the array of sensor assemblies 704 for processing for media displays such as a video display, or audio speakers. As used herein, the term "display" refers without limitation to any visual display device including e.g., LCD, plasma, TFT, CRT, LED, incandescent, fluorescent, and other types of indicator or image display technologies. SoC sink 702 may preferentially comprise graphics processors, applications processors, and or audio processors. In "thin clients" the SoC.

It will be recognized that while certain implementations and embodiments are described in terms of a specific sequence of steps of a method, these descriptions are only illustrative of the broader principles and architectures presented herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the principles and architectures presented herein. This description is in no way meant to be limiting, but rather should be taken as illustrative of the general principles of the disclosure. The scope should be determined with reference to the claims.

What is claimed is:

1. An image packing system, the system comprising:
an image sensor;
an interface, the interface configured to transport data; and a processing entity in communication with the image sensor and the interface, the processing entity configured to:
  receive data configured according to a first image format from the image sensor;
  encode the received data configured according to the first image format into a plurality of symbol sequences according to an encoding scheme based on a second image format different from the first image format; and
  map the plurality of symbol sequences into a plurality of transport packets for transmission over the interface based at least in part on a transport packet mapping scheme associated with the second image format; and
  insert a header packet among the plurality of transport packets, the header packet comprising information configured to (i) indicate a bit length of each pixel of the data configured according to the first image format, the bit length being determined from a plurality of different bit lengths, and (ii) unpack the plurality of transport packets from the second image format back into data configured according to the first image format via at least the indication of the bit length.

2. The system of claim 1, wherein:
the first image format comprises an RBG encoding and the second image format comprises a Y-only encoding; and
the first image format comprises a raw image format characterized by a defined bit length for each symbol sequence.

3. The system of claim 1, wherein the header packet further comprises a definition of a number of lanes to be used for transmission of the plurality of transport packets.

4. The system of claim 3, wherein the header packet further comprises information that defines an order of transmission for the plurality of transport packets in accordance with the definition of the number of lanes to be used for transmission.

5. The system of claim 4, wherein the defined order of transmission is further defined in accordance with a time division multiplexing scheme.

6. A method of packing raw data over an interface, the method comprising:
  capturing image data in a raw format, by an image sensor, for subsequent transmission to a sink device over a data channel, the image data captured in the raw format comprising data generated by the image sensor;
  encoding and mapping the image data captured in the raw format into a plurality of micro-packets in one or more DisplayPort symbol sequences in accordance with a DisplayPort Y-only data mapping scheme;
  inserting a main stream attribute (MSA) packet into the plurality of micro-packets, the MSA packet configured to indicate that the image data is both formatted according to the raw format comprising the data generated by the image sensor as well as bit length size per pixel of the image data captured in the raw format; and
  transmitting the plurality of micro-packets and inserted MSA packet to the sink device.

7. The method of claim 6, wherein the capturing of the image data comprises capturing image data of a fixed bit length.

8. The method of claim 7, further comprising selecting the fixed bit length from the group consisting of: 6, 7, 8, 10, 12, and 14 bits per pixel.

9. The method of claim 7, further comprising indicating the fixed bit length using three bits of a configuration field of the MSA packet.

10. The method of claim 6, further comprising configuring the DisplayPort Y-only data mapping scheme based on a bit length of one or more pixel data in the image data as well as a number of lanes used for the transmitting of the plurality of micro-packets.

11. The method of claim 10, further comprising selecting the number of lanes used for transmitting the image data from the group consisting of: 1, 2, and 4 lanes.

12. The method of claim 6, wherein the mapping of the image data captured in the raw format further comprises mapping in accordance with a time division multiplexing based scheme.

13. The method of claim 6, further comprising unpacking and reconstructing the transmitted plurality of micro-packets and inserted MSA packet into a copy of the image data in the raw format.

14. The method of claim 13, further comprising processing the copy of the image data into a format suitable for display.

15. A method of packing raw data over an interface, the method comprising:
  receiving data configured according to a first image format from a data content source, the received data of the first image format comprising a first set of words;
  encoding the received data configured according to the first image format into a plurality of symbol sequences according to an encoding scheme based on a second image format different from the first image format; and
  mapping the plurality of symbol sequences into a plurality of transport packets for transmission over the interface, the mapping based on a transport packet mapping scheme associated with the second image format;
  wherein at least one symbol sequence of the plurality of symbol sequences of the second image format comprises corresponding portions of at least two words of the first set of words of the first image format.

16. The method of claim 15, further comprising generating the first image format, the generating of the first image format comprises generating a raw image format characterized by a defined bit length for each symbol sequence.

17. The method of claim 16, wherein the generating of the first image format comprises generating using an image sensor.

18. The method of claim 17, wherein the encoding scheme further comprises defining a number of lanes of a main link that is to be used for transmitting the plurality of transport packets.

19. The method of claim 17, further comprising using a time division multiplexing based scheme for the transport mapping scheme.

20. The method of claim 19, further comprising packetizing a single data unit across multiple different transport packets in accordance with the time division multiplexing based scheme.

* * * * *